(12) United States Patent
Sasai et al.

(10) Patent No.: US 7,076,210 B2
(45) Date of Patent: Jul. 11, 2006

(54) COMMUNICATION METHOD, COMMUNICATION SYSTEM, AND COMMUNICATION DEVICE

(75) Inventors: Takashi Sasai, Kanagawa (JP); Hiroshi Kakuda, Tokyo (JP); Kazuya Odagiri, Kanagawa (JP); Koji Nishimura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/516,974

(22) PCT Filed: Jun. 5, 2003

(86) PCT No.: PCT/JP03/07135

§ 371 (c)(1),
(2), (4) Date: Dec. 6, 2004

(87) PCT Pub. No.: WO03/105361

PCT Pub. Date: Dec. 18, 2003

(65) Prior Publication Data

US 2005/0202782 A1    Sep. 15, 2005

(30) Foreign Application Priority Data

Jun. 7, 2002    (JP)    ............................. 2002-167746

(51) Int. Cl.
*H04B 7/00*    (2006.01)

(52) U.S. Cl. .................. 455/41.2; 455/404.2; 455/421; 455/456.1; 340/825.52; 340/3.51; 340/5.4; 370/338; 370/350; 370/503

(58) Field of Classification Search ............... 455/41.2, 455/404.2, 421, 456.1; 340/825.52, 3.51, 340/5.4
See application file for complete search history.

(56) References Cited

U.S. PATENT DOCUMENTS 5,453,982 A * 9/1995 Pennington et al. ........ 370/235

(Continued)

FOREIGN PATENT DOCUMENTS

| EP | 1 211 818 A1 | 6/2002 |
| JP | 2001-144781 | 5/2001 |

(Continued)

OTHER PUBLICATIONS

"Specification of the Bluetooth System", Version 1.1, Park K:1, Generic Access Profile, Specification of the Bluetooth System, Feb. 22, 2001, pp. 13-62, XP002313541.

(Continued)

*Primary Examiner*—Marceau Milord
(74) *Attorney, Agent, or Firm*—Finnegan, Henderson, Farabow, Garrett & Dunner, L.L.P.

(57) ABSTRACT

In the case where close range wireless communication is performed among a plurality of communication devices, when a predetermined connection operation is performed in a first communication device 10*a*, an inquiry message is wirelessly transmitted in order to discover a device to be connected by the wireless communication after restricting a transmissible distance to a close range; when a predetermined standby operation is performed in a second communication device 10*b*, the inquiry message is received and a response message to the received inquiry message is wirelessly transmitted; and when the response message is received, the first communication device 10*a* performs the connection processing with respect to the second communication device 10*b*.

25 Claims, 12 Drawing Sheets

U.S. PATENT DOCUMENTS

| | | | |
|---|---|---|---|
| 5,481,757 A * | 1/1996 | Mihara et al. | 725/119 |
| 5,680,419 A * | 10/1997 | Bottomley | 375/347 |
| 6,078,826 A * | 6/2000 | Croft et al. | 455/574 |
| 6,148,205 A | 11/2000 | Cotton | |
| 6,178,233 B1 * | 1/2001 | Yariv | 379/93.24 |
| 6,219,540 B1 * | 4/2001 | Besharat et al. | 455/421 |
| 6,236,835 B1 * | 5/2001 | Lockhart | 340/7.21 |
| 6,237,037 B1 * | 5/2001 | Larsson | 709/229 |
| 6,792,247 B1 * | 9/2004 | Law et al. | 455/41.2 |
| 6,826,387 B1 * | 11/2004 | Kammer | 455/41.2 |
| 6,842,460 B1 * | 1/2005 | Olkkonen et al. | 370/465 |
| 6,865,371 B1 * | 3/2005 | Salonidis et al. | 455/41.1 |
| 6,879,810 B1 * | 4/2005 | Bouet | 455/41.2 |

FOREIGN PATENT DOCUMENTS

| | | |
|---|---|---|
| JP | 2003-218733 | 7/2003 |
| JP | 2003-218785 | 7/2003 |
| WO | WO 01/86880 A2 | 11/2001 |

OTHER PUBLICATIONS

Bluetooth Specification Version 1.1, Part A "Radio Specification", pp. 15-32; Part B "Baseband Specification - Channel Control", pp. 92-110; Part C "Link Manager Protocol - Power Control", pp. 222-223, Bluetooth Specification, May 8, 2001, XP00228703.

* cited by examiner

Device to Be Discovered

Device to Be Discovered

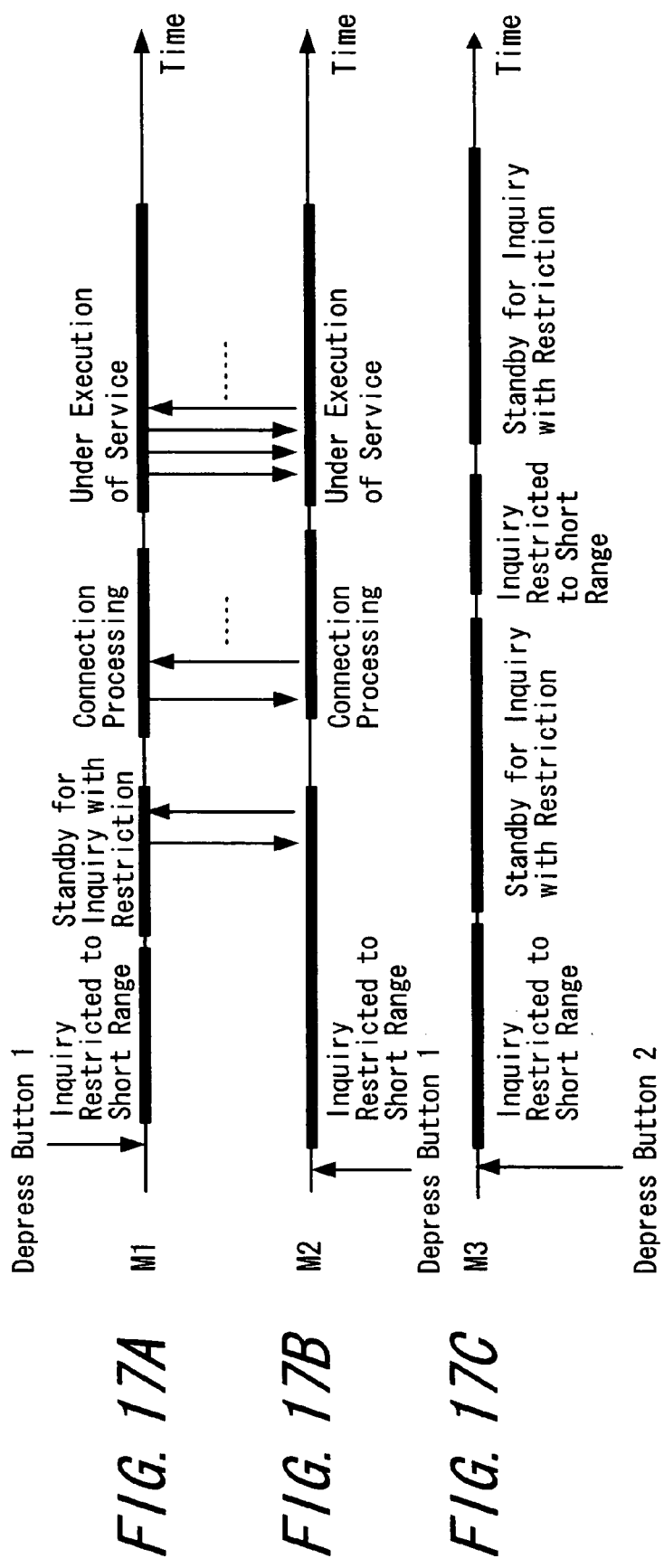

COMMUNICATION METHOD, COMMUNICATION SYSTEM, AND COMMUNICATION DEVICE

TECHNICAL FIELD

The present invention relates to a communication method suitable to be applied to a communication method of performing comparatively close range wireless communication and to a communication system in which the communication method is performed as well as a communication device which is applicable to the communication system.

BACKGROUND ART

In recent years, a communication method called Bluetooth® communication has attracted an attention as a close range wireless communication method up to approximately 100 m at maximum and various kinds of supporting device have been developed.

A close range wireless communication system such as the Bluetooth® communication which uses a wireless signal of a comparatively high frequency wave has an advantage such as no directivity and high transmissivity in comparison to an infrared data communication method which uses an infrared signal, and is expected that devices supporting the system increase in the future.

In a communication system to which the infrared data communication method is applied, in order to establish a connection for the communication it has been necessary to specify a device to establish communication with a light emitting portion of a device and a light receiving portion of another device, which are mutually a connection target, opposing to each other. Further, it has been necessary to maintain a position at a time of the connection during the communication due to its directivity. On the other hand, in the communication system using a high frequency signal such as the Bluetooth® communication, such restriction on the position becomes not necessary.

When the Bluetooth® communication is used, an inquiry message is transmitted as a broadcast message from a device which intends to start communication (hereinafter, referred to as a device A) in order to discover devices which exist in the neighborhood thereof. Then, a device which has received the inquiry message from the device A sends back a response message to the device A in response to that inquiry message. By receiving the response messages sequentially from respective devices which exist in the neighborhood, the device A can discover a plurality of communicable devices which exist in the neighborhood. In accordance with information of those response messages, the device A selects and specifies a device to which the connection is tried, and connection processing with respect to the device is performed. On this occasion, when the response messages are received from a plurality of devices, conventionally those are displayed in a form of list so that a user can make a selection.

In the Bluetooth® communication, not only a communication path is established, but also what kind of application and service is implemented in the communication path is defined clearly as a profile. As the profile, there are a serial port profile to perform serial communication, a personal area networking profile to realize a personal area network and the like. A service discovery protocol (hereinafter, referred to as a SDP) is defined as a procedure to determine those profiles and a service which is actually implemented.

The device A transmits to a device to be connected (hereinafter, referred to as a device B) an inquiry message querying what kind of service is provided by the device B in accordance with the SDP, the device B receives the inquiry message from the device A and then transmits to the device A information regarding a service provided by the device B as a response message to the inquiry. If the device B provides a desired service, the device A having received the response message requests the communication for the service, so that the desired service can be started between the device A and the device B.

As described above, a basic communication procedure in the Bluetooth® communication is that first the device A performs transmission of an inquiry message in order to discover a device which exists in the neighborhood and also performs reception of a response message thereto; selects a desired device from devices which have responded; further, makes an inquiry to the device whether the desired service is available; and furthermore, requests the communication for that service.

The Bluetooth® standard is managed by Bluetooth SIG Inc. and specifications describing the details are published by Bluetooth SIG Inc.

Meanwhile, in a close range wireless communication system such as the Bluetooth® communication, an inquiry message to discover a device which exists in the neighborhood is targeted at all devices which exist within a communicable range (for example, from 10 m to 100 m). Accordingly, when many communicable devices exist in the neighborhood, enormous number of response messages are to be received. Conventionally, such an operation procedure of showing information regarding a device included in those response messages in a display or the like is required so that a user can select the desired device; however, when many devices exist in the neighborhood, the user must spend a huge amount of time for the selection operation and its usability becomes deteriorated, which has been a problem. Further, in order to judge whether the device is really a target device to connect or not, information such as an ID which is provided by the device needs to be identified, and therefore, there has been a possibility for the user to make an excessive operation.

In order to solve the above problem, a method of efficiently performing a procedure to discover a device to be connected by altering a reaching range of an inquiry message has been proposed in Japanese Published Patent Application No. 2001-144781, for example. According to the method, it is possible to efficiently specify the device to be connected by restricting a searching range of devices to a close range, for example, so that the number of devices to be discovered is limited.

However, when many devices exist within the close range, the same problem as before still occurs, and therefore, such a procedure of selecting a specific device from a list by the user is required, for example. This problem still remains when considering that each device existing around us will be supported by a network in the future. Further, in this method, an attention is paid to easily discovering a device to be connected, and a subsequent operation such as a selecting procedure of a service to be started cannot be simplified.

The present invention is made in view of such circumstances, and aims to perform easily and securely a communication service between devices when performing wireless communication which is represented by the Bluetooth® communication.

DISCLOSURE OF THE INVENTION

A first aspect of the present invention is a communication method in which at least first and second communication devices are provided and wireless communication is performed by a predetermined communication system between the respective communication devices, wherein when a predetermined connection operation is performed in the first communication device, an inquiry message to discover a device to be connected by the wireless communication is wirelessly transmitted with limiting a transmissible distance to a close range; when a predetermined standby operation is performed by the second communication device, the inquiry message is received and a response message is wirelessly transmitted in response to the received inquiry message; and when the response message is received by the first communication device, connection processing is performed with respect to the second communication device. Accordingly, since a target device can be specified by bringing devices to be connected close to each other and by depressing buttons for connection on both sides or the like, the communication between the specific devices can be established easily and securely.

A second aspect of the present invention is the communication method according to the first aspect of the present invention, wherein processing to restrict the transmissible distance to a close range is the processing to set transmission power in a communication processing means to a limited value which is smaller than the transmission power at the time of normal wireless communication. Accordingly, the transmissible distance can be restricted to a close range due to the limitation of the transmission power.

A third aspect of the present invention is the communication method according to the first aspect of the present invention, wherein the wireless transmission of the inquiry message by the predetermined connection operation and/or the reception of the inquiry message by the predetermined standby operation are performed while operation means provided in respective communication devices are continuously operated. Accordingly, the transmission or the reception of the inquiry message can be performed excellently in the continuous operation.

A fourth aspect of the present invention is the communication method according to the first aspect of the present invention, wherein after the connection processing is completed, data transfer processing is performed in accordance with a program which is being executed in the first communication device or in the second communication device. Accordingly, the data transfer processing can be performed at excellent timing.

A fifth aspect of the present invention is the communication method according to the first aspect of the present invention, wherein the second communication device is made to have a lower reception sensitivity to the inquiry message so that only the inquiry message wirelessly transmitted from a close range can be received. Accordingly, only the inquiry message wirelessly transmitted from the close range can easily be received.

A sixth aspect of the present invention is the communication method according to the first aspect of the present invention, wherein the connection operation in the first communication device and the standby operation in the second communication device are made to be a common operation, and when the common operation is performed, transmission processing of the inquiry message and reception processing of the inquiry message are made to be performed alternately. Accordingly, both the transmission processing of the inquiry message and the reception processing of the inquiry message can be performed in a single operation.

A seventh aspect of the present invention is the communication method according to the first aspect of the present invention, wherein the connection operation in the first communication device is a limited inquiry message which is distinguishable from a type of the inquiry message and the second communication device is made to await the limited inquiry message. Accordingly, transmission processing of the limited inquiry message can be performed.

An eighth aspect of the present invention is the communication method according to the first aspect of the present invention, wherein the connection operation in the first communication device is made to select a general inquiry message or an arbitrary limited inquiry message which should be transmitted, and the second communication device is made to select the general inquiry message or the arbitrary limited inquiry message which should be awaited. Accordingly, both the transmission of the general inquiry message and the transmission of the limited inquiry message can be performed.

A ninth aspect of the present invention is a communication system including at least a first communication device and a second communication device between which wireless communication is performed by a predetermined communication method, wherein the first communication device includes: a communication processing means to perform transmission and reception of a wireless signal, a connection operation means, and a control means to make an inquiry message transmitted from the communication processing means in a state where the transmissible distance is restricted to the close range when the connection operation means is operated and to perform connection processing with respect to a transmission source of the response message when the response message to the inquiry message is received; and the second communication device includes: a communication processing means to perform transmission and reception of a wireless signal, a standby operation means, and a control means to make the inquiry message received by the communication processing means when the standby operation means is operated and to make a response message to the received inquiry message wirelessly transmitted by the communication processing means. Accordingly, since a target device can be specified by bringing devices to be connected close to each other and by depressing buttons for connection on both sides or the like, the communication between the specific devices can be established easily and securely.

A tenth aspect of the present invention is the communication system according to the ninth aspect of the present invention, wherein processing in the first communication device to restrict the transmissible distance to a close range is the processing to set transmission power in the communication processing means to a limited value which is smaller than the transmission power at the time of normal wireless communication. Accordingly, the transmissible distance can be restricted to the close range due to the limitation of the transmission power.

An eleventh aspect of the present invention is the communication system according to the ninth aspect of the present invention, wherein while the connection operation means of the first communication device is continuously operated, the control means of the first communication device makes the inquiry message transmitted; and while the standby operation means of the second communication device is continuously operated, the control means of the second communication device makes the inquiry message received. Accordingly, the transmission or the reception of the inquiry message can be performed excellently in the continuous operation.

A twelfth aspect of the present invention is the communication system according to the ninth aspect of the present invention, wherein when the connection processing by the control means of the first communication device is completed, data transfer processing is performed in accordance with a program which is being executed in the first or the second communication device. Accordingly, the data transfer processing can be performed at excellent timing.

A thirteenth aspect of the present invention is the communication system according to the ninth aspect of the present invention, wherein the communication processing means of the second communication device makes the reception sensitivity to the inquiry message lower so that only the inquiry message which is transmitted wirelessly from a close range can be received. Accordingly, only the inquiry message which is transmitted wirelessly from the close range can easily be received.

A fourteenth aspect of the present invention is the communication system according to the ninth aspect of the present invention, wherein the connection operation means of the first communication device and the standby operation means of the second communication device are made to be a common operation means, and when the common operation means is operated, the control means of respective communication devices perform control to make the transmission processing of the inquiry message and the reception processing of the inquiry message alternately performed by the communication processing means. Accordingly, both the transmission processing of the inquiry message and the reception processing of the inquiry message can be performed in a single operation A fifteenth aspect of the present invention is the communication system according to the ninth aspect of the present invention, wherein the inquiry message in the first communication device is a limited inquiry message which is distinguishable from a general inquiry message, and the second communication device is made to await the limited inquiry message. Accordingly, transmission processing of the limited inquiry message can be performed.

A sixteenth aspect of the present invention is the communication system according to the ninth aspect of the present invention, wherein the connection operation in the first communication device is made to select a general inquiry message or an arbitrary limited inquiry message which should be transmitted and the second communication device is made to select the general inquiry message or the arbitrary limited inquiry message which should be awaited. Accordingly, both the transmission of the general inquiry message and the transmission of the limited inquiry message can be performed.

A seventeenth aspect of the present invention is a communication device which performs wireless communication with another communication device by a predetermined communication method, including: a communication processing means to perform transmission and reception of a wireless signal, a connection operation means, and a control means to make an inquiry message transmitted from the communication processing means in a state where a transmissible distance is limited to a close range when the connection operation means is operated and to perform connection processing with respect to a transmission source of the response message when the response message to the inquiry message is received. Accordingly, the communication with a specific device can be established easily and securely.

An eighteenth aspect of the present invention is the communication device according to the seventeenth aspect of the present invention, wherein the processing to restrict the transmissible distance to a close range is the processing to set transmission power in the communication processing means to a limited value which is smaller than the transmission power at the time of normal wireless communication. Accordingly, the transmissible distance can be restricted to the close range due to the limitation of the transmission power.

A nineteenth aspect of the present invention is the communication device according to the seventeenth aspect of the present invention, wherein while the connection operation means is continuously operated, the control means performs processing to make the inquiry message transmitted. Accordingly, the transmission of the inquiry message can be performed excellently in the continuous operation.

A twentieth aspect of the present invention is the communication device according to the seventeenth aspect of the present invention, wherein when the connection processing is completed by the control means, data transfer processing is performed in accordance with a program which is being executed. Accordingly, the transfer processing of data can be performed at excellent timing.

A twenty-first aspect of the present invention is the communication device according to the seventeenth aspect of the present invention, further including a standby operation means, and when the standby operation means is operated, the control means makes the inquiry message received by the communication processing means and makes the response message to the received inquiry message wirelessly transmitted by the communication processing means. Accordingly, both the transmission processing of the inquiry message and the reception processing of the inquiry message can be performed in a single operation.

A twenty-second aspect of the present invention is the communication device according to the seventeenth aspect of the present invention, further including a standby operation means, and when the standby operation means is operated, the control means makes the inquiry message received by the communication processing means and makes the response message to the received inquiry message wirelessly transmitted by the communication processing means; the connection operation means and the standby operation means are made to be a common operation means; and when the common operation means is operated, the control means performs control to make the transmission processing of the inquiry message and the reception processing of the inquiry message alternately performed by the communication processing means. Accordingly, processing can be performed by operating the common operation means.

A twenty-third aspect of the present invention is the communication device according to the seventeenth aspect of the present invention, wherein the connection operation means includes a means to select a type of the inquiry message so that the inquiry message of a selected arbitrary type can be transmitted. Accordingly, the inquiry message of the selected type can be transmitted.

A twenty-fourth aspect of the present invention is a communication device which performs wireless communication with another communication device using a predetermined communication method, including: a communication processing means to perform transmission and reception of a wireless signal, a standby operation means, and a control means to make an inquiry message received by the communication processing means when the standby operation means is operated and to make a response message to the received inquiry message wirelessly transmitted by the communication processing means. Accordingly, the communication with a specific device can be established easily and securely.

A twenty-fifth aspect of the present invention is the communication device according to the twenty-fourth aspect of the present invention, wherein the control means performs processing to make the inquiry message received while the standby operation means is continuously operated. Accordingly, the reception of the inquiry message can be performed excellently in the continuous operation.

A twenty-sixth aspect of the present invention is the communication device according to the twenty-fourth aspect of the present invention, wherein the communication processing means makes the reception sensitivity to the inquiry message lower so that only the inquiry message wirelessly transmitted from the close range can be received. Accordingly, only the inquiry message transmitted from the close range can be received easily.

A twenty-seventh aspect of the present invention is the communication device according to the twenty-fourth aspect of the present invention, wherein the standby operation means includes a means to select the inquiry message which should be awaited so that the inquiry message of a selected arbitrary type can be received. Accordingly, the inquiry message of the selected type can be received.

BRIEF DESCRIPTION OF DRAWINGS

FIGS. 17A to 17C are timing charts showing an example of transmission which is performed in the devices of the example shown in FIG. 16.

BEST MODE FOR CARRYING OUT THE INVENTION

Hereinafter, an embodiment of the present invention is explained referring to the attached drawings. In this embodiment, the present invention is applied to a handheld information terminal device to perform wireless communication according to the Bluetooth® communication which is one of wireless communication methods used in comparatively close range wireless communication.

Figure 1:
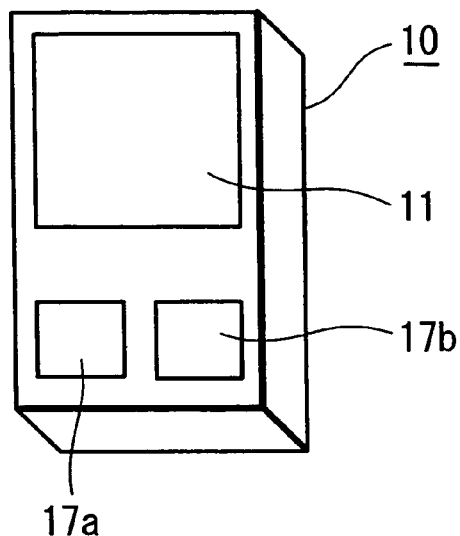
FIG. 1 is a perspective view showing an example of an appearance of a communication device according to an embodiment of the present invention.

FIG. 1 is a view showing an example of an external appearance of a handheld information terminal device according to this embodiment. A handheld information terminal device 10 of this embodiment is provided with a display panel 11 including a liquid crystal picture display means or the like in which characters and figures can be displayed on the display panel 11. The display panel 11 is included as a touch panel, so that input operation can be performed by touching with a finger or an input stylus. Further, a connection button 17a and a standby button 17b are arranged as operation buttons. Other operation buttons may be arranged as well.

The handheld information terminal device 10 is a device capable of performing the wireless communication according to the Bluetooth® communication which is one of wireless communication methods, and is configured to be capable of performing transmission data to and reception data from another device by the Bluetooth® wireless communication. The connection button 17a is a button to start connection of the wireless communication to another device which exists in the neighborhood of the handheld information terminal device 10, and the standby button 17b is a button to set a receivable state in accordance with a connection request for wireless communication to the handheld information terminal device 10 from another device.

Figure 2:
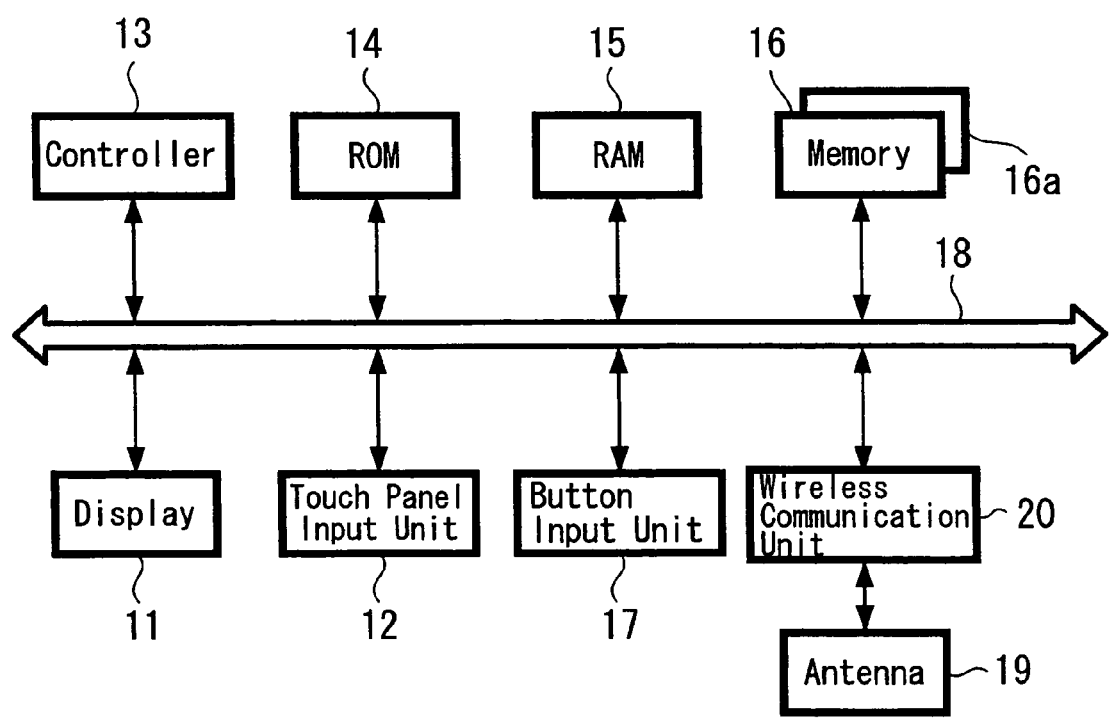
FIG. 2 is a block diagram showing an example of a configuration of a communication device according to an embodiment of the present invention.

FIG. 2 is a block diagram showing an internal configuration of the handheld information terminal device 10 of this embodiment. As heretofore explained, a touch panel input unit 12 is included at a position where the display 11 is arranged to be capable of performing a touch input by touching a surface or the like of the display 11 with the finger or the stylus. A controller 13 is formed of a central processing unit (CPU) or the like to control the whole handheld information terminal device 10 by performing various kinds of control processing in accordance with programs stored in a memory medium 23a loaded in a ROM 14 or in a memory 23. Further, in a RAM 15, the program used by the controller 13 or temporary data which is under processing is stored when it is necessary.

A memory medium 16a loaded in a memory 16 is formed of a magnetic or optical memory medium, or a semiconductor memory. In this case, a plurality of recording media may be included as the memory medium 16a. Further, the memory medium may be the one which is fixed to the memory 16 or the one which is freely detachable. Moreover, a program or data stored in the memory medium 16a can be received from another device connected through an arbitrary communication line, or the memory 16 utilizes, as its own memory medium 16a, a memory medium 16a of another device connected through the arbitrary communication line.

The display 11 includes, for example, a liquid crystal display panel and a drive circuit thereof to show to a user various kinds of information based on an instruction from the controller 13.

The touch panel input unit 12 is integrally formed with the display 11, and is made to recognize a position which is input from the user by sensing a pressure, for example. The controller 13 is made to interpret user's various kinds of operation and performs appropriate processing based on information displayed on the display 11 and user's input operation in the touch panel input unit 12.

A button input unit 17 is formed of the connection button 17a, the standby button 17b and the like as shown in FIG. 1, and the operation signal thereof is sent to the controller 13.

A wireless communication unit 20 is formed of a processing circuit to process the wireless communication according to the Bluetooth® communication standard, the control circuit thereof and the like, and an antenna 19 is connected thereto. Hereupon, a communicable range by the wireless communication unit 20 is predetermined by transmission power or the antenna 19 or the like, and in the case of the Bluetooth® communication standard applied to the wireless communication unit 20, the range will be approximately from 10 m to 100 m. In this embodiment, explanation will be made given that the wireless communication unit 20 has the communicable range of 10 m; however, it is needles to say the range can also be any arbitrary distance.

The blocks from the controller 13 to the wireless communication unit 20 which are heretofore explained are connected to each other with a bus line 18 so that various kinds of data and operation signals can be transferred and the handheld information terminal device 10 can be controlled appropriately by the controller 13. Note that, when viewing from the wireless communication unit 20, a portion controlled by the controller 13 is hereinafter referred to as a host side in the explanation.

Figure 3:
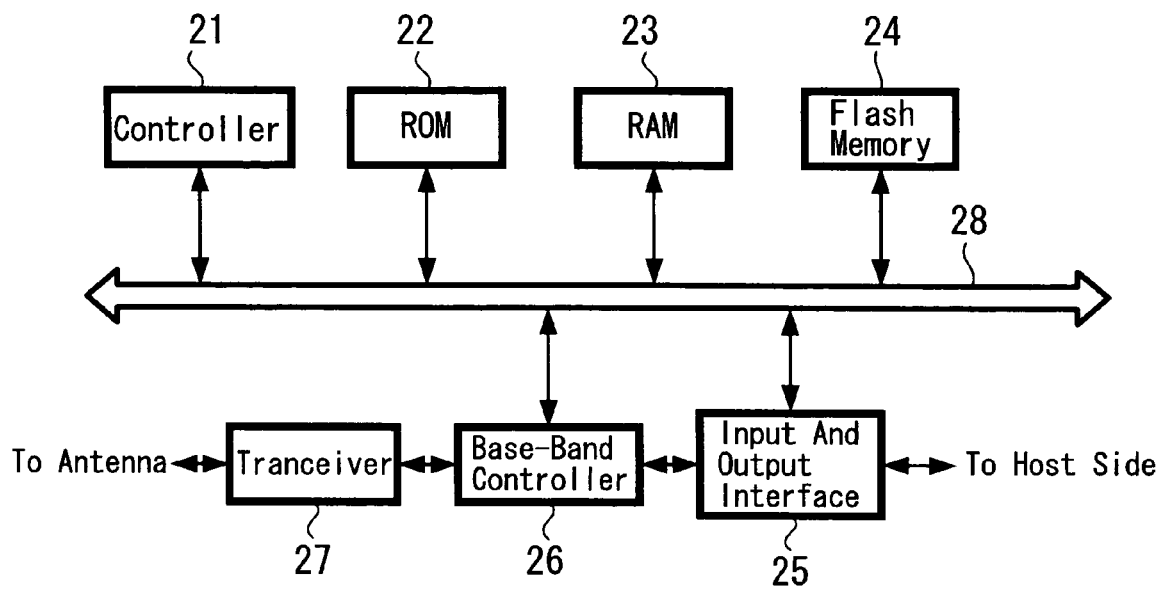
FIG. 3 is a block diagram showing an example of a configuration of a wireless communication unit according to an embodiment of the present invention.

FIG. 3 is a block diagram showing an example of a configuration of the wireless communication unit 20. A controller 21 in the wireless communication unit 20 executes in a RAM 23 a control program stored in a ROM 22 to control the operation of the whole wireless communication unit 20. Temporary data or the like is also stored in the RAM 23. In addition, information required at a time of close range communication described later on is also stored in the control program stored in the RAM 23. Specifically, for example, a value of output power of a transmission amplifier that is set in a transceiver 27, which is required when close range wireless transmission is performed, is stored to make transmission power of a wireless transmission signal regulated according to the output power when the close range wireless communication is performed. Information required for this close range wireless communication may be stored in other memory media such as a flash memory 24.

In the flash memory 24, for example, a device address which is unique to a communication device of the Bluetooth® communication standard, a link key which is a common key to be utilized at a time of authentication performed between individual communication devices and the like are stored and are supplied to the controller 21 according to a necessity.

An input-output interface 25 is an interface to exchange data and a command with the host side, and is called a host controller interface in the Bluetooth® communication. The input-output interface 25 supplies the data and command, which are supplied through the bus line 18 shown in FIG. 2, to the controller 21 and a base-band controller 26; and, on the contrary, supplies the data, which is supplied from the controller 21 and the base-band controller 26, to the controller 13 through the bus line 18.

The base-band controller 26 provides the transceiver 27 with the data supplied from the input-output interface 25 to be wirelessly transmitted. Further, the signal supplied from the transceiver 27 is digitized to be supplied to the host side through the input-output interface 25. Hereupon, various kinds of control such as a link, a packet, a logical channel and security as well as processing such as error correction coding, multiplexing, randomization of data are also performed.

The transceiver 27 performs frequency hopping modulation and power control with respect to the digital data supplied from the base-band controller 26 to be wirelessly transmitted through the antenna 19. Further, with respect to the data received through the antenna 19, a correlation is taken by generating a frequency hopping signal, a jamming wave component is reduced using a filter, and FSK decoding is performed to supply the digital data to the base-band controller 26.

The blocks from the controller 21 to the base-band controller 26 in the wireless communication unit 20 are mutually connected by a bus line 28, so that various kinds of data and operation signal can be transferred and the wireless communication unit of the Bluetooth® communication standard can be controlled appropriately by the controller 21.

Figure 4:
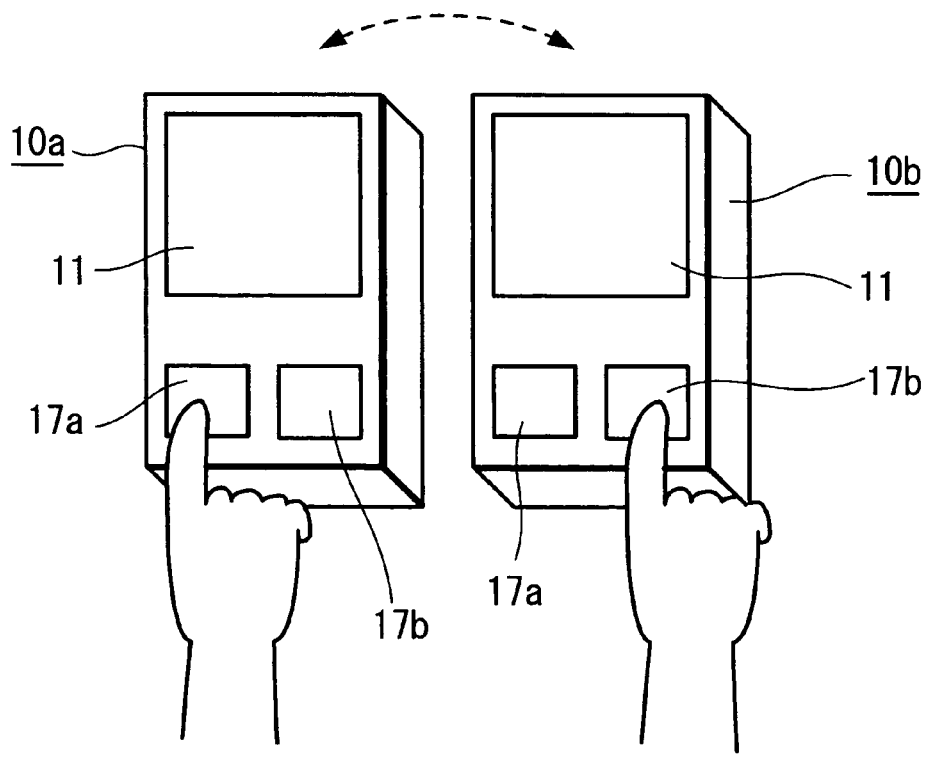
FIG. 4 is an explanatory view showing an example of communication according to an embodiment of the present invention.

Next, an explanation is made with respect to communication processing which uses the handheld information terminal device 10 of this embodiment. In this embodiment, as shown in FIG. 4, two sets of handheld information terminal devices 10a and 10b having similar configuration to the handheld information terminal device 10 are prepared; in a state where those two handheld information terminal devices 10a and 10b are brought very close to each other, the connection button 17a is depressed in the handheld information terminal device 10a of one side and the standby button 17b is depressed in the handheld information terminal device 10b of the other side; so that the wireless communication only between those closely positioned two handheld information terminal devices 10a and 10b is started to execute an appropriate service. In this case, even if there also exist other communication terminal devices of the Bluetooth® communication standard within a range capable of performing the wireless communication with the handheld information terminal device 10a, a communication terminal device other than the terminal device 10b in which the standby button 17b is operated can not be connected in the state where the connection button 17a is operated.

Figure 5:
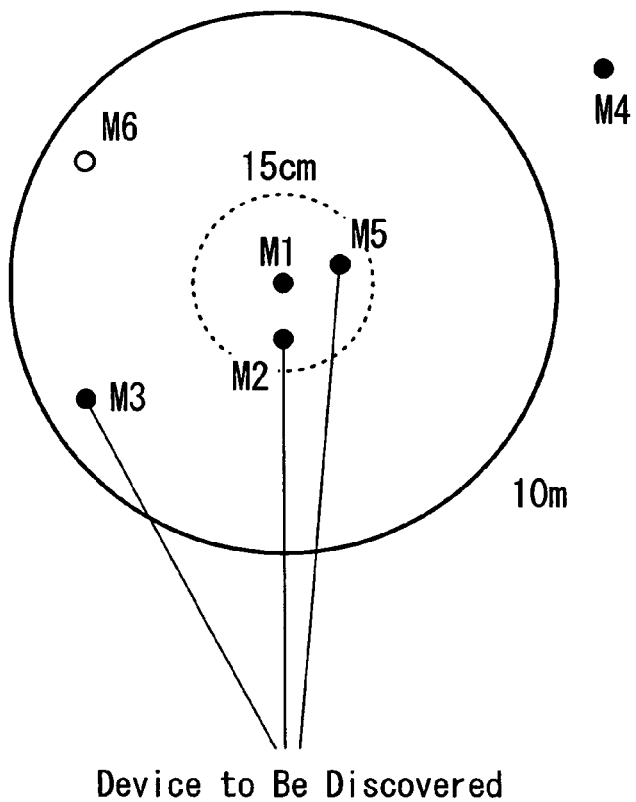
FIG. 5 is an explanatory view showing an example of an inquiry (an example without limitation) according to an embodiment of the present invention.

Next, an explanation is made with respect to an operation when the wireless communication is performed using the handheld information terminal device 10 of this embodiment. It is assumed that the handheld information terminal device 10 of this embodiment has a transmission output power capable of performing the wireless communication within a range of, for example, 10 m at the time of wireless communication by the conventional Bluetooth® communication standard. FIG. 5 schematically shows an appearance when an inquiry message is sent in conventional transmission output power.

FIG. 5 shows a state in which there exist a plurality of terminal devices M1, M2, M3, M4, M5 and M6 which have the same configuration as the handheld information terminal device 10 or which have a different configuration of the Bluetooth® communication standard. Hereupon, it is assumed that at least the terminal device M1 and the terminal device M2 have the same configuration as the handheld information terminal device 10.

Here, it is assumed that the terminal device M1 is the handheld information terminal device which has sent an inquiry message with a conventional transmission output power; the terminal devices M2, M3 and M5 are in a standby state of being able to respond; and the terminal device M6 is not in a standby state.

The terminal device M1 is capable of sending an inquiry message within the range of 10 m around the terminal device. When the inquiry message is sent, a device which exists within the range of a circle of 10 m radius centered around the terminal device M1 and also which is in the standby state to be able to respond to an inquiry message from another terminal device transmits a response message to the terminal device M1 which has sent the inquiry message.

Hereupon, since it is unknown at which frequency channel and on what timing a device in the standby state is awaiting, the terminal device M1 performs frequency hopping at appropriate timing and series so as to cover all frequency channels during a certain period of time. In the Bluetooth® communication, approximately 10 seconds are recommended as a necessary value to collect the ample number of responses from the neighborhood. Furthermore, a device in the standby state also performs appropriately the frequency hopping so that the inquiry message can be received. As a result, when the timing and frequency channel of the inquiry message coincide with the timing and frequency channel of a device in the standby state, the device in the standby state can receive the inquiry message and furthermore, can transmit a response message at the appropriate timing.

Figure 6:
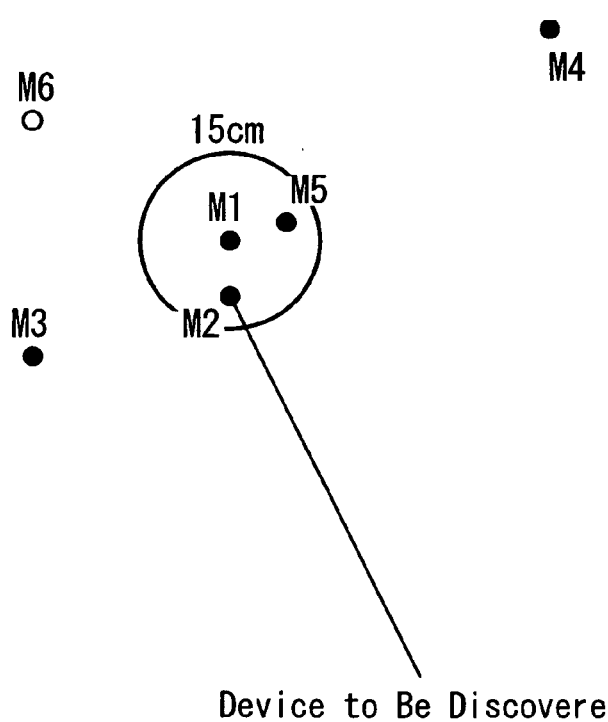
FIG. 6 is an explanatory view showing an example of an inquiry (an example with limitation) according to an embodiment of the present invention.

In the case of the example shown in FIG. 5, inquiry processing is continuously performed for approximately 10 seconds for example, so that the terminal device M1 receives the response messages from the devices which exist within the range of 10 m radius centered around the terminal device M1 and also which are in the standby state to be capable of responding to the inquiry message, namely, which are terminal devices M2, M3 and M5. Here, the terminal device M6 does not respond since the device is not in a state of being capable of responding, and the terminal device M4 can not receive the inquiry message since the device is located beyond the reaching range of the message. As a result, the user conventionally needs to select one to be connected among those three devices based on information individually distinguished such as, for example, a device name designated arbitrarily to a device and an address exclusively provided for each device (a device address of the Bluetooth® communication). Subsequently, FIG. 6 schematically shows the case when only within a close range a limited inquiry message is sent. In the example of FIG. 6, it is also assumed that the terminal device M6 is not in the state of being capable of responding and the other terminal devices are in the state of being capable of responding.

The terminal device M1 is made to have narrower communicable range than a conventional one by making the transmission power reduced less than the conventional one or the like based on a particular instruction from the user (specifically, depressing the connection button 17a, for example) to be capable of transmitting a communication message only to a very close range. Hereupon, as shown in FIG. 6, it is assumed that the transmission power or the like is limited so that a message can only be transmitted within the range of a circle of approximately 15 cm radius centered around the terminal device M1, for example. Here, it is assumed that only the terminal device M2 exists within the range of approximately 15 cm radius centered around the terminal device M1. Note that, in the following description when it is described that the transmission distance or the like is limited to the close range, it means that the limitation is made to the range of approximately 15 cm. In the case of performing the close range wireless transmission to reach only an extent to approximately 15 cm radius, the transmission power is lowered by approximately 60 dB to 70 dB in comparison to the case of performing the wireless transmission to reach the extent of approximately 10 m radius at the time of conventional communication.

Next, an explanation is made with respect to a limited inquiry message; here the limited inquiry message is an inquiry that is distinguishable from a general inquiry message which can be responded by all communication devices in a standby mode to be capable of responding to an inquiry message and that is limitedly used according to a specific purpose; and it is assumed that only a device which is in a state of being able to await the limited inquiry message responds to the limited inquiry message. It should be noted that the limited inquiry message is not necessarily only one kind but a plurality of kinds may be provided therefor.

In the Bluetooth® communication, an inquiry message is distinguished by including a code called IAC (Inquiry Access Code) which indicates a type of inquiry. Among those codes, it is specified that GIAC (General IAC) is a code to which all devices capable of responding can respond to the inquiry and DIAC (Dedicated IAC) is a code (a plurality of codes) to which only a device under a specific condition can respond to the inquiry. The DIAC is the code used by a communication device which performs an inquiry and a standby according to a specific purpose and, for example, LIAC (Limited IAC) among the DIAC is a code to which only a device capable of awaiting the inquiry code (LIAC) only during a certain limited period of time (recommended not to exceed 30 seconds) can respond. In other words, the device can be set to be capable of responding to the limited inquiry only during the certain limited short period of time. In the following explanation of the Bluetooth® communication, an inquiry of the GIAC may be the general inquiry and an inquiry of the LIAC may be the limited inquiry. In addition, it is needless to say, the limited inquiry can be the inquiry of an arbitrary DIAC other than the LIAC.

In this embodiment, when a connection button 12 is depressed in the terminal device M1 (equivalent to the terminal device 10a shown in FIG. 4), the limited inquiry message is sent only within the close range. Further, when a standby button 13 is depressed in the terminal device M2

(equivalent to the terminal device 10b shown in FIG. 4), the terminal device M2 is made to await in a state of being capable of receiving the limited inquiry message and of responding thereto only during a certain period of time. Therefore, when the connection button 17a is depressed in the terminal device M1 and at the same time the standby button 17b is depressed in the terminal device M2, a device capable of responding to the limited inquiry message of the terminal device M1 is a device existing within the range of approximately 15 cm and awaiting to be capable of responding to the limited inquiry message, namely, that is only the terminal device M2.

Hereupon, the terminal device M3, which has responded to the inquiry message from the terminal device M1 at the time of conventional communication as in the example of FIG. 5, can not receive the inquiry message since it is positioned distantly. The terminal device M5 is capable of receiving the inquiry message since it is positioned near by; however, it is unable to respond since it is not made to respond to the limited inquiry message. As a result, the user can specify uniquely the terminal device M2 which is the device to be connected to the terminal device M1, and there is no need to perform the operation to select the desired device out of a plurality of devices, which has been necessary at the time of performing the communication as shown in FIG. 5.

In this embodiment as described above, the selection of the device to connect can be made automatically by disposing two terminal devices very close to each other and by simultaneously depressing both the connection button and the standby button. Furthermore, since the device to be connected can be specified, after the connection is established it is possible to automatically select an appropriate service to be executed according to a state of the terminal device.

Next, processing in a terminal device on a transmitting side of an inquiry message and processing in a terminal device on a responding side to the inquiry message are explained referring to flow charts.

Figure 7:
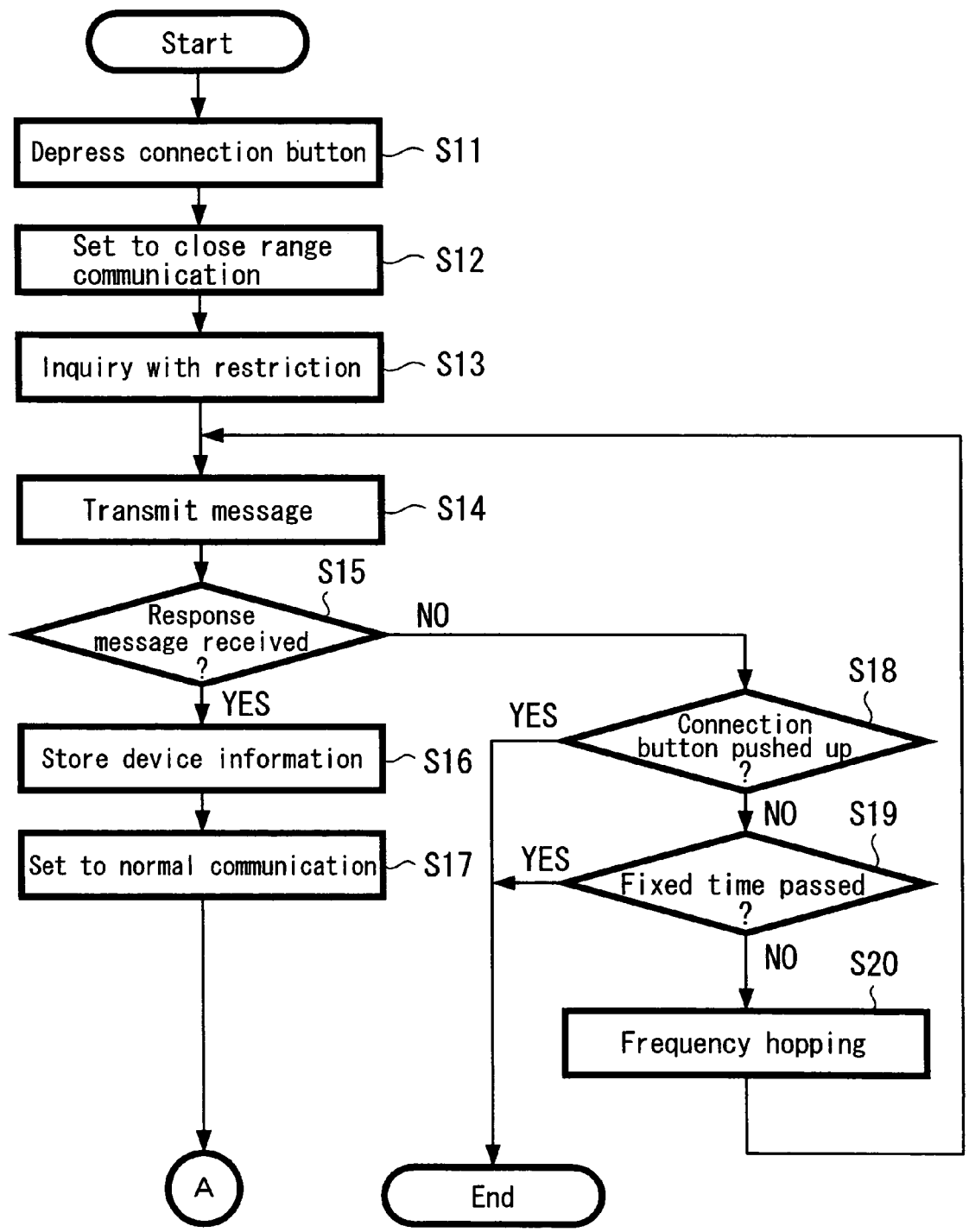
FIG. 7 is a flow chart showing an example of processing when a connection button is operated according to an embodiment of the present invention.
Figure 8:
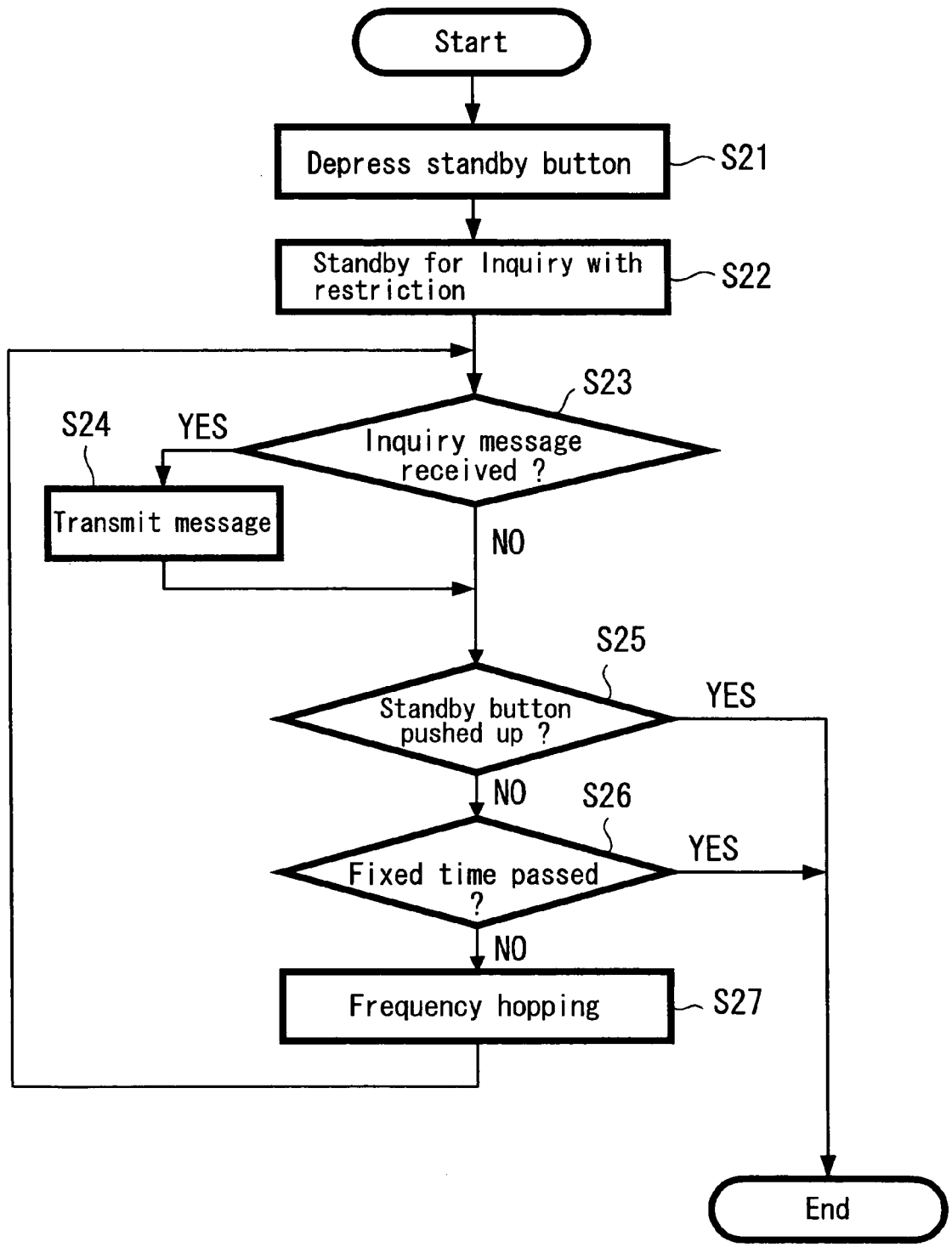
FIG. 8 is a flow chart showing an example of processing when a standby button is operated according to an embodiment of the present invention.
Figure 9:
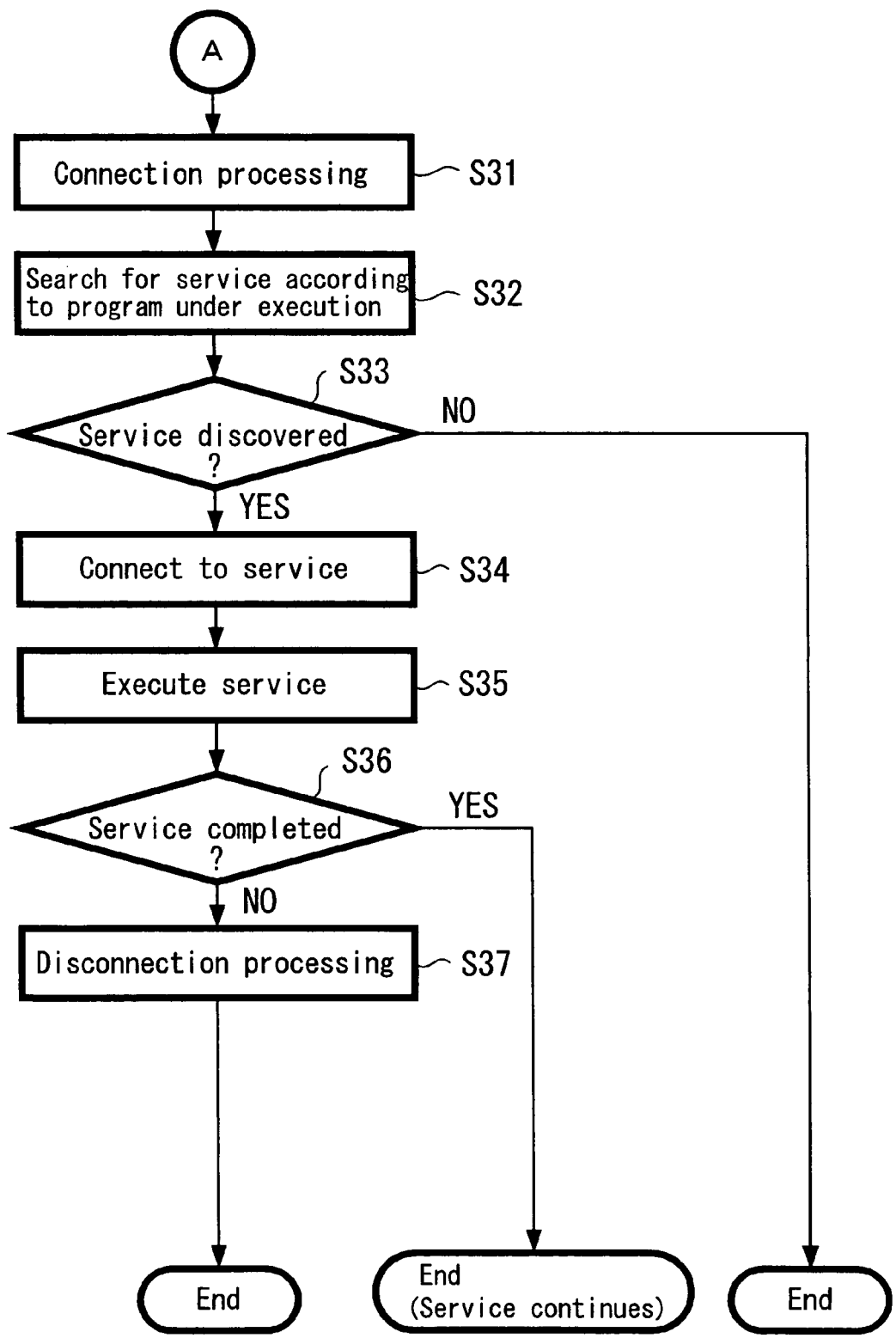
FIG. 9 is a flow chart showing an example of processing after a connection is established according to an embodiment of the present invention.

FIG. 7 is a flow chart showing a processing procedure in the terminal device (corresponding to the terminal device M1 in FIG. 6) on the transmitting side of the inquiry message, and FIG. 8 is a flow chart showing a processing procedure in the terminal device (corresponding to the terminal device M2 in FIG. 6) on the responding side to the inquiry message. Further, FIG. 9 is a flow chart showing a processing procedure of a connection on the side of the terminal device which has transmitted the inquiry message.

First, the processing procedure on the side of the terminal device which transmits the inquiry message is explained referring to FIG. 7; a user starts the inquiry processing by depressing the connection button 17a of the terminal device 1 (Step S11).

The controller 13 which has detected that the connection button 17a has been depressed sends to the wireless communication unit 20 a command to set appropriate transmission power to make the message transmitted only to the close range. The wireless communication unit 20 performs the setting to adjust the transmission power in the transceiver 27 based on information relating to the transmission power which is stored in advance in the ROM 22, the flash memory 24 or the like. After the setting is completed, the fact is responded to the controller 13 through the input-output interface 25 (Step S12).

Subsequently, the controller 13 sends to the wireless communication unit 20 a command to transmit a limited inquiry message (Step S13). In this command, the maximum number of devices to be discovered by the inquiry message and a period of time in which the inquiry message is continuously transmitted can be provided as parameters. In this embodiment, approximately 10 seconds is set as the time to be capable of collecting the ample number of responses from neighboring devices and one is set as the maximum number of device to be discovered.

The wireless communication unit 20 generates a limited inquiry message in the base-band controller 26 in accordance with the command issued from the host side through the input-output interface 25, and transmits the limited inquiry message through the transceiver 27 and the antenna 19 (Step S14). In addition, the transmission power in the transceiver 27 at this time is set to be controlled based on information related to the transmission power which is stored in the ROM 22, the flash memory 23 or the like, and therefore, the limited inquiry message is transmitted only to the close range.

Then, the explanation is made with respect to processing on the side of the terminal device which responds to the reception of the inquiry message; as shown in the flow chart of FIG. 8, the standby processing for the limited inquiry message starts by depressing the standby button 17b of the terminal device (Step S21). The controller 13 which has detected that the standby button 17b has been depressed sends to the wireless communication unit 20 a command to respond to the limited inquiry message. The wireless communication unit 20 awaits an inquiry message from another device at a predetermined periodical interval and at a certain frequency (Step S22).

If an inquiry message from another device is received (Step S23), the wireless communication unit 20 transmits to the device a response message to the inquiry (Step S24). Further, at that time, the fact may be indicated to the user in the display 11 of the terminal device or the like to let the user push up the standby button 17a.

Subsequently, if the standby button 17b is pushed up, the controller 13 instructs the wireless communication unit 20 to suspend the standby processing, and the wireless communication unit 20 suspends the standby processing (Step S25) to finish the standby processing for the limited inquiry message. Furthermore, if a certain predetermined time has already passed, the wireless communication unit 20 suspends the standby processing (Step S26) to finish the standby processing for the limited inquiry message.

If the processing is not suspended at the steps S25 and S26, the wireless communication unit 20 changes the frequency for standby (Step S27) and subsequently repeats the standby processing of the limited inquiry message. As described above, on the side of the terminal device in which the standby button 17b is operated, the standby button is being depressed, and also, the terminal is made to be capable of responding to the limited inquiry message during the certain predetermined period of time.

The explanation is returned to the flow chart in FIG. 7; on the side of the terminal device in which the connection button 17a is operated, after the limited inquiry message is transmitted to the close range, the terminal device awaits an response message to the limited inquiry message from another device (Step S15). If a target terminal device is in a state of step S23 in the flow chart of FIG. 8 and if the device is set to receive the limited inquiry message at the same timing and at the same frequency, the wireless communication unit 20 of the target terminal device transmits the response message to the limited inquiry message through the antenna 19 (Step S24) and the wireless communication unit 20 on the side of the terminal device which has transmitted the inquiry message can receive the response message through the antenna 19.

The response message received by the terminal device includes a specific ID (a device address in the Bluetooth® communication) capable of uniquely identifying the terminal device, which is obtained and is supplied to the host side through the input-output interface 25 (Step S16). Also, in this case, since the device which can be inquired is limited to one device, the wireless communication unit 20 ends the inquiry processing at this point of time. Moreover, at that time, the fact that the response to the inquiry has been received may be indicated to the user in the display 11 to let the user push up the connection button 17a. In the case where a response message cannot be received from another device, first the controller 13 instructs the wireless communication unit 20 to suspend the inquiry processing when the connection button 17a is being pushed up, and then the wireless communication unit 20 suspends the inquiry processing (Step S18) to end the transmission processing of the inquiry message. Further, if the certain predetermined time has passed, the wireless communication unit 20 suspends the inquiry processing (Step S19) to end the transmission processing of the inquiry message.

If the processing is not suspended at the steps S18 and S19, the wireless communication unit 20 changes the frequency at the time of transmitting the message (Step S20), and subsequently the transmission processing of the limited inquiry message is repeated.

At the step S16, the controller 13 stores the specific ID of the terminal device included in the response message into the RAM 15, and subsequently sends a command to the wireless communication unit 20 to return to the normal state from the state in which the command has been given to the wireless communication unit 20 at the step S12 to set to transmit only to the close range. The wireless communication unit 20 performs the setting such that the transmission power thereafter returns to the normal state (in other words, to be capable of performing the wireless communication in the transmission distance of 10 m) based on the information relating to the transmission power, which is stored in advance in the ROM 22, the flash memory 24 or the like. After the setting is completed, the fact is responded to the controller 13 through the input-output interface 25 (Step S17).

With the above described processing in two terminal devices which are disposed close to each other, the terminal device of the other side can be specified uniquely from the terminal device of one side by depressing mutually the connection button 17a and the standby button 17b.

Further, since the terminal device of the other side can be specified uniquely from the terminal device of one side, subsequently a connection from the terminal device which has transmitted the inquiry message to the terminal device which has sent back the response message, and an execution of a service can be performed.

FIG. 9 is a flow chart showing processing procedure until the establishment of the connection and further the execution of the service, following the processing of the step S17 in the flow chart of FIG. 7. Hereupon, the terminal device on the side which has transmitted the inquiry message is called a terminal device 1 and the terminal device on the side which has sent back the response message is called a terminal device 2.

Figure 11:
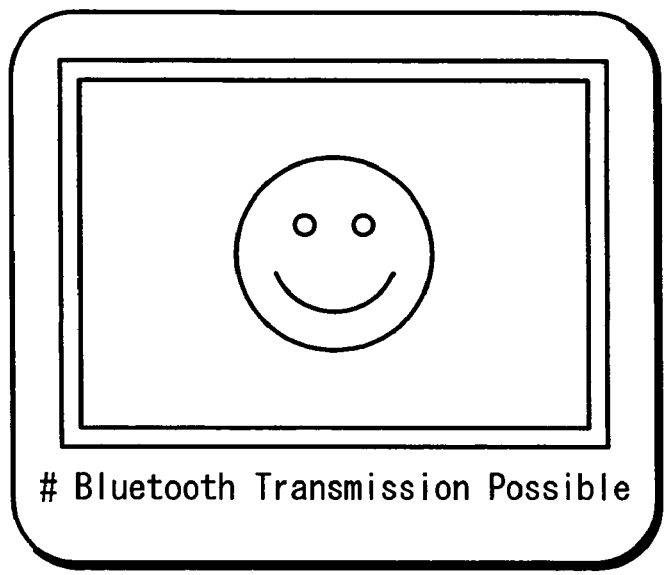
FIG. 11 is an explanatory view showing an example of a screen display in a terminal device (in an initial state) according to an embodiment of the present invention.

Here, it is assumed that the terminal device on the side which has transmitted the inquiry message (terminal device 1) is executing a video display program and the video display program has a function of transmitting video data to another device by the wireless communication. FIG. 11 is an example of a display on the screen of the display 11 in the terminal device 1, and it is assumed that the processing in the terminal device 1 shown in the flow charts of FIGS. 7 and 9 are being performed in the state where the display shown in FIG. 11 is performed.

At the step S16 of the flow chart in FIG. 7, the terminal device 1 stores in the RAM 15 the specific ID of the terminal device 2 to be connected. The controller 13 performs the connection processing with respect to the device address which is the specific ID of the terminal device 2 and which is temporarily stored in the RAM 15 of the wireless communication unit 20 (Step S31). In this connection processing, there is a case in which connection authentication processing is required for the Bluetooth® communication depending on settings of respective devices, and this connection authentication is performed by inputting identification information called a passkey.

When the connection between the terminal device 1 and the terminal device 2 is established, the terminal device 1 searches in accordance with a predetermined protocol (called a service discovery protocol) whether the terminal device 2 provides the desired service. This is performed by transmitting a service inquiry message including a specific ID indicating a specific service (service UUID) to the terminal device 2 and by transmitting a response message to the inquiry message from the terminal device 2 (step S32). In this embodiment, since the video display program is under execution, the ID of the service which can be used for video transfer is searched. The control information is stored in the ROM 14, the memory 16, the memory medium 16a or the RAM 15 together with application programs such as the video display program.

On the other hand, the terminal device 2 is made to await so as to be able to respond to a specific service. For example, while the video display program is being executed similarly to the terminal device 1, the terminal device may be controlled to be in a state in which the service that can be used for the video transfer is awaited or to be in a state in which all services continuously available are awaited. Further, similarly to the state of awaiting the inquiry message in FIG. 8, the terminal device 2 may be controlled to await such that an appropriate service corresponding to a program currently executed can be performed only during the standby button 17b being depressed. Such control information is also stored in the ROM 14, the memory 16, the memory medium 16a or the RAM 15 together with the application programs such as the video display program. Then, when it is found at the step S33 of the flow chart in FIG. 9 that the terminal device 2 is able to provide the desired service, the terminal device 1 requests the terminal device 2 to connect to the desired service (step S34). In this connection processing, there is a case in which the connection authentication processing is required for the Bluetooth® communication depending on settings of the respective devices. This connection authentication is conventionally performed by inputting the identification information called the passkey and by inquiring the user of connection permission confirmation. Further, when it is found that the terminal device 2 does not provide the desired service at the step S33 of the flow chart in FIG. 9, the processing of performing the connection and the service shall be ended without performing further processing.

When the service connection is established, the terminal device 1 performs an appropriate service procedure in accordance with a status of program currently executed (step S35). In this embodiment, since the wireless communication is started while a certain video file is being displayed as shown in the example of a display of FIG. 11, the video file is transmitted to the terminal device 2. As shown in FIG. 11, when it is possible to perform certain processing by the wireless communication, a message such as the one shown in a lower part of the display panel of FIG. 11 (for example, "# Bluetooth® transmission is available") may be indicated so that the user easily understand. Such control information is also stored in the ROM 14, the memory 16, the memory medium 16a or the RAM 15 together with application programs such as the video display program.

Figure 12:
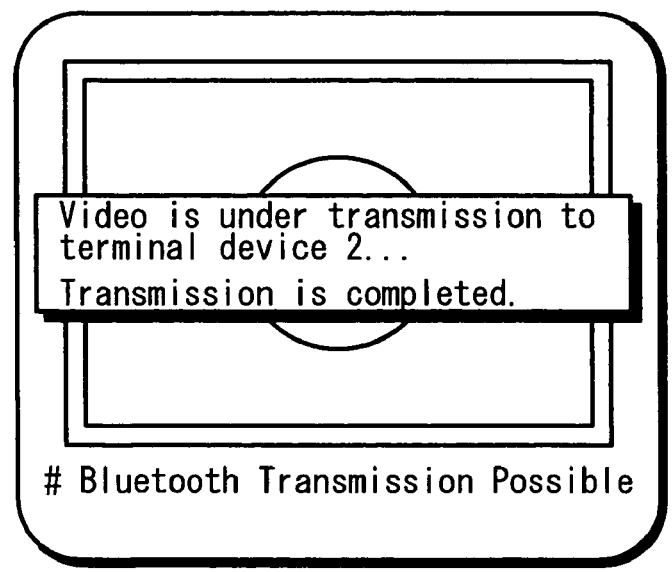
FIG. 12 is an explanatory view showing an example of a screen display in the terminal device (at a time of transmitting video data) according to an embodiment of the present invention.
Figure 13:
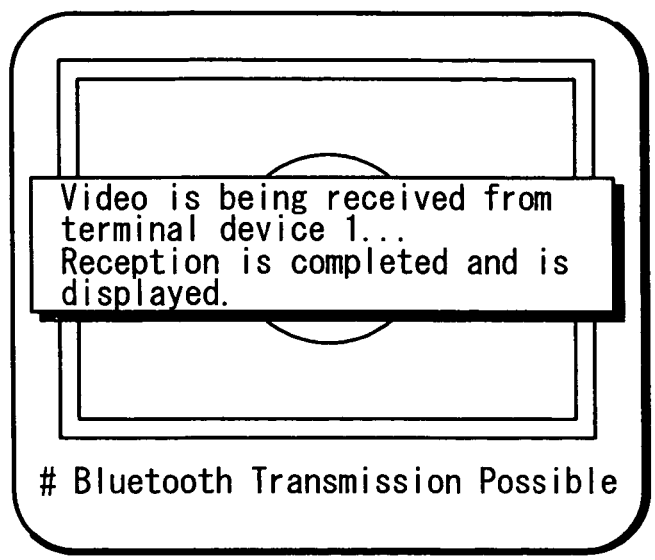
FIG. 13 is an explanatory view showing an example of a screen display in the terminal device (at a time of receiving video data) according to an embodiment of the present invention.

When the service is executed, specifically, when the transmission of the video data is started, the content and result of the executed service, which is in this case the fact that the video data has been transmitted to the terminal device 2, is as shown for example in FIG. 12 indicated accordingly to the user on the screen formed of the display 11 in the terminal device 1. Furthermore, as shown in FIG. 13, for example, on the screen formed of the display 11 in the terminal device 2 the fact that the video data is received from the terminal device 1 is indicated to the user accordingly. Moreover, on the screen formed of the display 11 in the terminal device 2, the received video data may be displayed immediately.

After the desired service is executed (step S36), the controller 13 instructs the wireless communication unit 20 to disconnect the communication when the service is of a type in which the wireless communication is not required to be maintained and continued thereafter (step S37). On the contrary, when it is such service that needs to maintain the wireless communication, the service shall be continued without being disconnected. As an example of the former, there is a case of this embodiment in which the wireless communication is used for the video transfer, and as an example of the latter, there is a case such as dial-up communication or IP network communication which is a service providing a communication path. Such control information is also stored in the ROM 14, the memory 16, the memory medium 16a or the RAM 15 together with application programs such as the video display program.

As described above, with the above processing between two terminal devices brought close to each other, in which the connection button 17a and the standby button 17b is respectively depressed, the limited inquiry and the response thereto can be performed in the close range; only the terminal device of the other side can be specified uniquely from the terminal device of one side; further, the connection of the wireless communication is automatically established in accordance with the executing state of the program and the standby state for the service at the respective terminal devices; and the desired service can be executed. For example, when the desired service is the video transfer, the video is transferred from the terminal device of one side to the terminal device of the other side and after the transfer is completed, the disconnection processing may be performed from the terminal device of one side to the terminal device of the other side.

Figure 10:
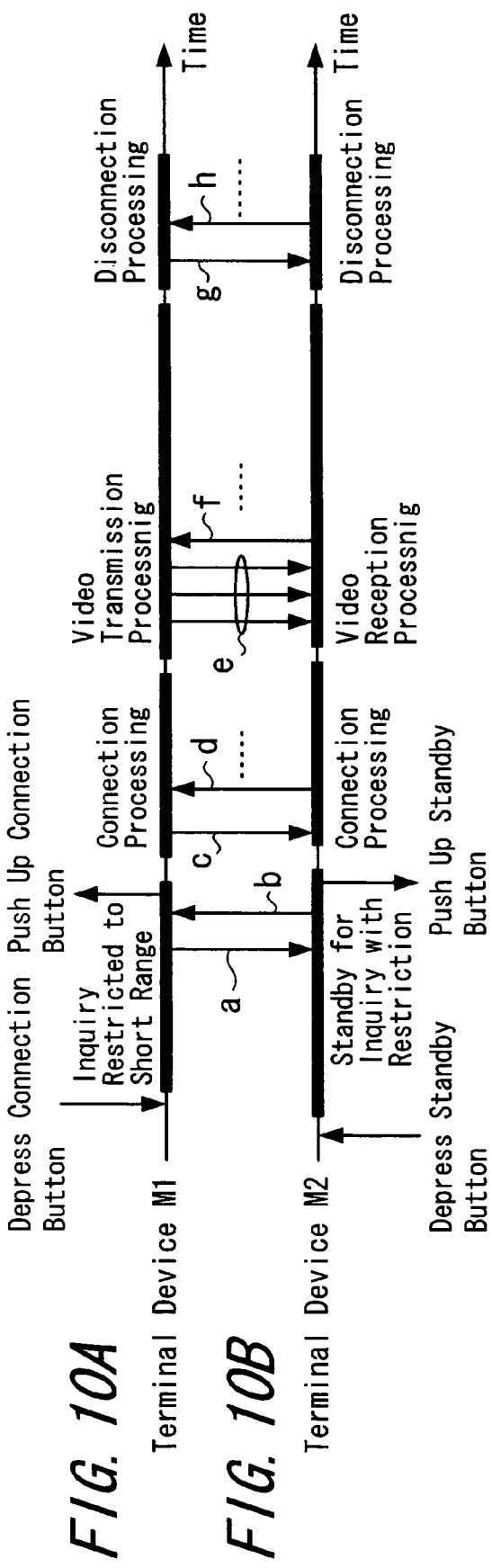
FIGS. 10A and 10B are timing charts showing an example of transmission according to an embodiment of the present invention.

FIGS. 10A and 10B are diagrams showing an example of a transmission state from starting the wireless communication until disconnecting the communication using the connection button and the standby button in two terminal devices M1 and M2 which are disposed close to each other. As shown in FIG. 10A, when the connection button 17a of the terminal device M1 is depressed, transmission a of a limited inquiry message in a close range (short range) is performed. Then, since the standby button 17b of the terminal device M2 is being depressed as shown in FIG. 10B, a standby for receiving the limited inquiry message is performed and transmission b of a response message is performed.

Subsequently, users operating respective terminal devices perform an operation to stop depressing the connection button 17a of the terminal device M1 and an operation to stop depressing the standby button 17b of the terminal device M2 to enter connection processing for establishing the connection. Hereupon, transmission c from the terminal device M1 and transmission d from the terminal device M2 are performed alternately, and confirmation of an ID of the destination terminal device, an inquiry of a service and the like are performed to complete the connection.

After the connection is completed between two terminal devices M1 and M2, transmission e of the video data from the terminal device M1 is performed; reception processing of the video data wirelessly transmitted is performed in the terminal device M2; and when the data is received properly, transmission f of a confirmation response packet is performed. Then, when the transmission of the video data is completed, the process enters disconnection processing of the established connection, and with transmission g of a disconnection request from the terminal device M1 and transmission h of a response to the disconnection request from the terminal device M2, the wireless connection between two terminal devices M1 and M2 is disconnected to finish the wireless communication processing.

In addition, although the connection button 17a and the standby button 17b are respectively used in the processing which has been explained so far in order to instruct the terminal device of one side to perform the connection and the terminal device of the other side to perform the standby, a button displayed on the screen of the display 11 functioning also as a touch panel may be used to be touched, for example. Moreover, it is also possible to perform a similar operation by an operation of other operation means.

Further, as the operation of the connection button 17a and the standby button 17b, although the control is performed to transmit the inquiry message only during the button 17a being depressed, for example, with respect to the connection button 17a, it is possible to make the inquiry message transmitted only during a certain period of time after the connection button 17a is depressed and is released immediately, for example, or it is also possible to sequentially perform the processing of the inquiry, the connection and the service execution only during the connection button 17a being depressed, which indicates that the wireless communication is suspended immediately after the connection button 17a is released.

Although, as to the standby button 17b, the control is also performed similarly to respond to the inquiry message only during the button being depressed, it is possible to respond to the inquiry message only during a certain period of time after the standby button 17b is depressed and is released immediately, for example, or it is also possible to sequentially perform the response to the inquiry and the standby for the service only during the standby button 17b being depressed, which indicates that the Bluetooth® communication is suspended immediately after the standby button 17b is released.

Moreover, in the handheld information terminal device which has so far been explained, two buttons of the connection button 17a and the standby button 17b are provided to make the connection button operated on the side of the terminal device which performs the inquiry and to make the standby button operated on the side of the terminal device which performs the standby; however, it is also possible to use one button in common as the connection button and the standby button, so that a operation can be performed in common on the side of the terminal device which performs the inquiry and on the side of the terminal device which performs the standby.

Figure 14:
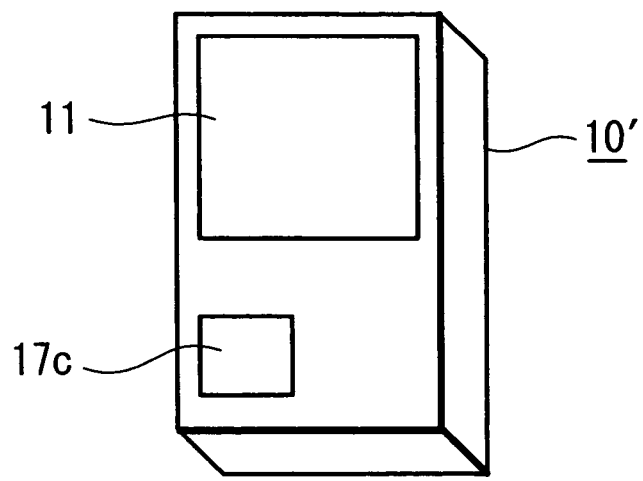
FIG. 14 is a perspective view showing an example of an appearance of a communication device according to another embodiment of the present invention (an example in which one button is used in common)

Specifically, as shown in FIG. 14 for example, as a handheld information terminal device 10' for performing the communication in the close range, only a connection button 17c is provided and only the connection button 17c is depressed both on the side of the terminal device which performs the inquiry and on the side of the terminal device which performs the standby. As processing at the time when the connection button 17c is depressed, transmission of a limited inquiry message which is restricted to the close range and the standby for the inquiry message are performed alternately in the respective terminal devices and a period of performing the transmission of the inquiry message and a period of performing the standby for the inquiry message are randomly set, so that when processing is performed for a certain period of time, the inquiry message transmitted from the terminal device of one side can be received by the terminal device of the other side to be able to enter the connection processing.

Figures 15A, 15B:
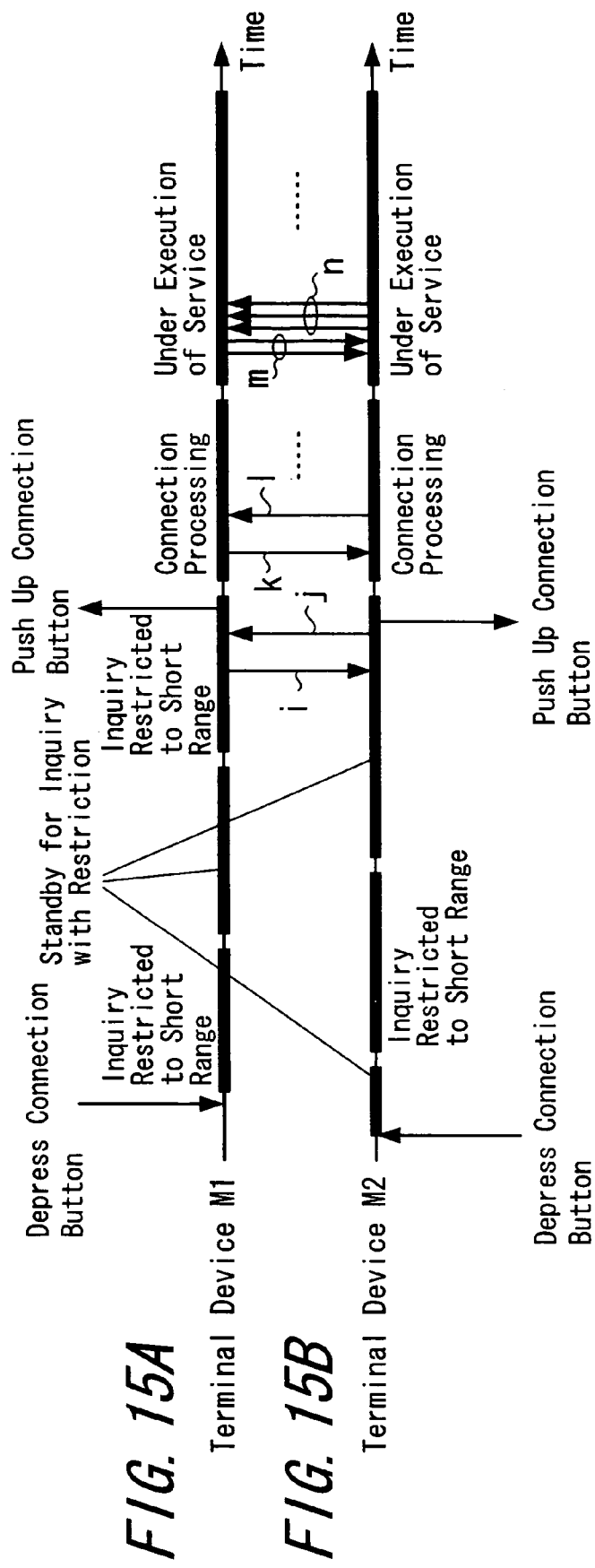
FIGS. 15A and 15B are timing charts showing an example of transmission which is performed in the device of the example shown in FIG. 14.

FIGS. 15A and 15B are diagrams showing an example of the transmission of the above case. Hereupon, it is assumed that two terminal devices M1 and M2 are respectively formed as the handheld information terminal device 10' including only the connection button 17c for close range communication and the connection button 17c is depressed almost simultaneously. With this depression, the transmission and the standby of the inquiry message are set alternately at a random cycle in the respective terminal devices M1 and M2. Here, when a certain period of time has passed after the start of the depression, an inquiry message i which is transmitted from the terminal device M1 is received by the terminal device M2 and a response message j to the inquiry is sent back to the terminal device M1. At a stage when the transmission of the response message j is completed, the depression of the connection buttons 17c in the respective terminal devices M1 and M2 is stopped to enter transmission k and l for connection processing; and thereafter, there is two way transmission m and n of a predetermined service such as the video data transfer and after the transmission is completed, disconnection processing (not shown in the figures) is performed.

Thus, since the connection processing restricted to the close range can be performed by the operation of only one connection button which is provided in respective terminal devices, the user operating each of the terminal devices M1 and M2 is only required to operate the same button when operating either of the terminal devices, and therefore, the operation becomes simple to the extent.

Figure 16:
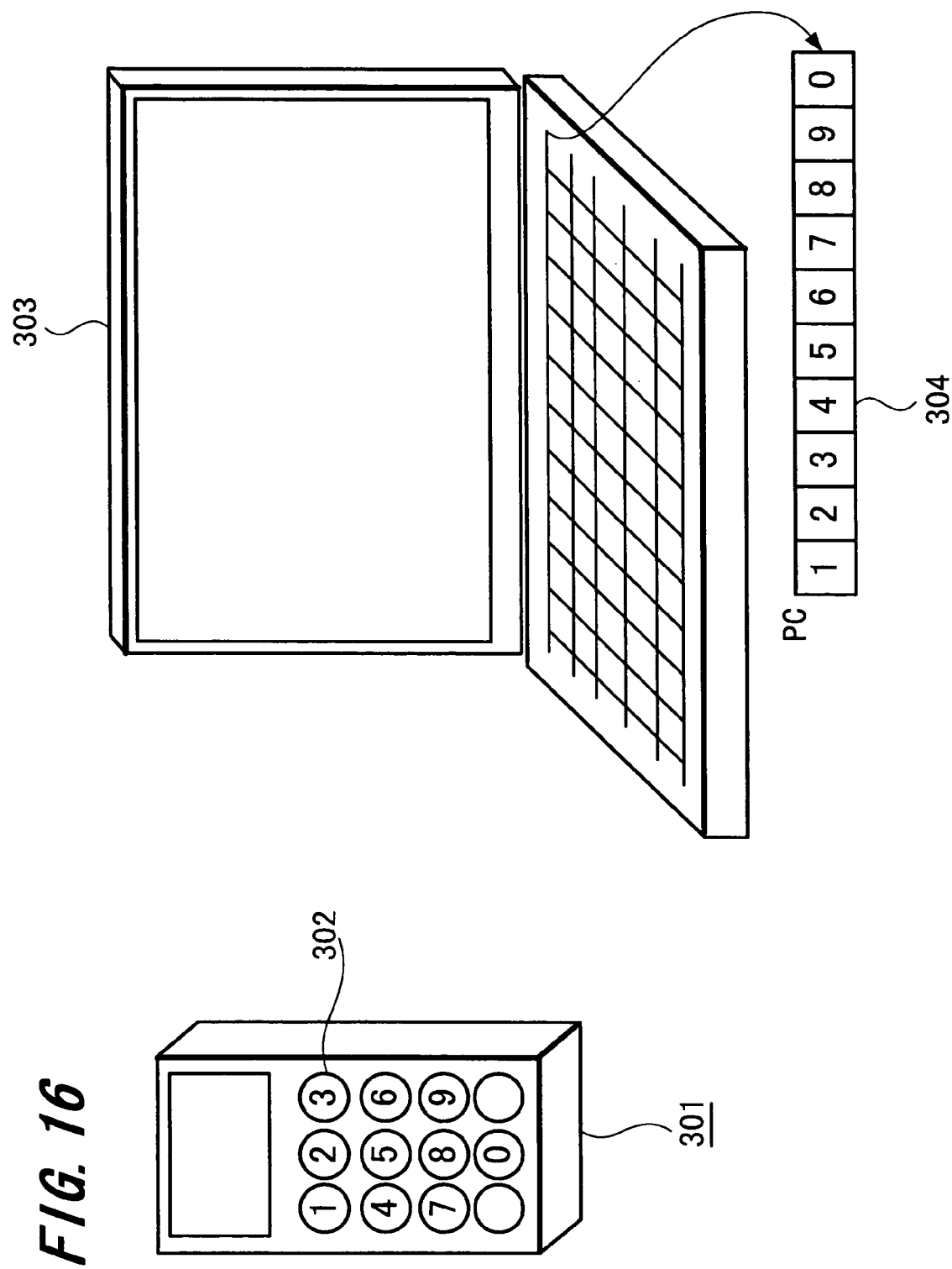
FIG. 16 is an explanatory view showing an example of communication according to further another embodiment of the present invention (in which a mobile phone unit and a personal computer apparatus are used)

Further, such configuration is also possible, in which an input means with which the user can individually designate a plurality of limited inquiry messages and a standby for the messages is provided. FIG. 16 shows an example of a configuration of that case. A mobile phone unit 301 is provided with a button group 302 capable of performing a numerical input to perform a limited inquiry message which corresponds to the numerical input and the standby therefor. Similarly, a computer apparatus 303 is provided with a numerical key group 304 as a part of a keyboard capable of performing the numerical input to perform a limited inquiry message which corresponds to that numerical input and the standby therefor.

FIGS. 17A to 17C are time charts showing a connection procedure when those mobile phone unit and personal computer apparatus are used. Hereupon, the terminal device M1 is the mobile phone unit 301, the terminal device M2 is the personal computer apparatus 303, and the terminal device M3 is another computer apparatus which is not shown in the figure. The terminal devices M1, M2 and M3 are made to repeat the inquiry and the standby at a random cycle in accordance with the sequence shown in the embodiment explained above.

Specifically, an operation to input a specific key 1 is performed using the button group 302 in the terminal device M1, so that, a procedure, which is the procedure of a limited inquiry corresponding to the key 1 and a standby therefor, is performed (FIG. 17A). Also in the terminal device M2, the key 1 is similarly inputted to perform the similar procedure (FIG. 17B). Further, in the terminal device M3, a key 2 is inputted to perform the procedure of a limited inquiry corresponding to the key 2 and a standby therefor (FIG. 17C). Hereupon, since the terminal devices M1 and M2 perform the same limited inquiry, similarly to the case explained in the above embodiment, the connection is established between the terminal devices M1 and M2 and a service is executed. On the other hand, since the terminal device M3 performs the limited inquiry of the different number, the connection cannot be established with the terminal devices M1 and M2.

Accordingly, it becomes possible to perform the specific limited inquiry in devices mutually desired to connect, for example, by inputting the same numerical key, and when it is wished to mutually connect the specific devices under circumstances where a plurality of devices exist in a certain range, the devices can be connected easily.

Further, in the above described handheld information terminal device in order to make the wireless communication restricted to the close range such as 15 cm, the processing of limiting the transmission output power on the transmitting side is performed; however another processing may be used to make the wireless communication restricted to the close range. For example, without changing the transmission output power the receiving sensitivity in the handheld information terminal device on the receiving side may be lowered at the time of a standby so as to make the wireless communication restricted to the close range. As an alternative, both the limitation of the transmission output power on the transmitting side and the change of the receiving sensitivity on the receiving side may be performed.

Further, in the configuration which has been explained so far, the present invention is applied to a communication device of a handheld information terminal device, for example; however, it is needless to say the application is also possible to a communication device having other configurations. For example, a close range wireless communication unit such as that of the Bluetooth® communication may be incorporated in (or, externally attached to) a mobile phone unit, a digital camera, a digital video camera, a television receiver, a portable music player, a headphone and the like to perform the similar processing.

Further, although an example to which the Bluetooth® communication is applied as the wireless communication method has been explained, other wireless communication method can also be employed.

Furthermore, in the above described embodiment, although an example is explained in which a communication apparatus such as a handheld information terminal device is formed as a device exclusively used for communication, it is also possible that a card or the like, in which a circuit for data communication is incorporated, is attached to a data processing apparatus such as a personal computer apparatus for example, and a program to perform the processing explained in the above described flow charts is installed in the computer apparatus so that a system to perform the similar processing is configured.

INDUSTRIAL APPLICABILITY

According to the present invention, since a communication target device can be specified by bringing the devices to be connected close to each other and by depressing buttons for the connection on both sides or the like, the communication between the specific devices can be established easily and securely.

Further, since the communication target device can securely be specified, predetermined processing can be performed immediately in accordance with a state of a program which is being executed in the device of one side. Accordingly, in a state where a video is displayed in the device of one side for example, with depressing the button the transmission of the video or the like can be performed automatically with respect to the device which exists in the neighborhood and in which the button has been depressed similarly. Accordingly, a user can execute a specific application and service easily.

Furthermore, when the device to be connected is personal belongings, the effectiveness can be most obtained. For example, when it is desired to connect one's own mobile phone unit and personal computer apparatus to perform dial-up communication, a user holds the mobile phone unit by the right hand and brings it close to the personal computer apparatus, and almost simultaneously the button of the mobile phone unit is depressed by the right hand and the button of the personal computer apparatus is depressed by the left hand to start the communication securely between the mobile phone unit and the personal computer apparatus, so that the operability is greatly improved.

DESCRIPTION OF REFERENCE NUMERALS 10, 10', 10b . . . HANDHELD INFORMATION TERMINAL DEVICE
11 . . . DISPLAY
12 . . . TOUCH PANEL INPUT UNIT
13 . . . CONTROLLER
14 . . . ROM
15 . . . RAM
16 . . . MEMORY
16a . . . MEMORY MEDIUM
17 . . . BUTTON INPUT UNIT
17a . . . CONNECTION BUTTON
17b . . . STANDBY BUTTON
17c . . . CONNECTION BUTTON
18 . . . BUS LINE
19 . . . ANTENNA
20 . . . WIRELESS COMMUNICATION UNIT
21 . . . CONTROLLER
22 . . . ROM
23 . . . RAM
24 . . . FLASH MEMORY
25 . . . INPUT-OUTPUT INTERFACE
26 . . . BASE-BAND CONTROL UNIT
27 . . . TRANSCEIVER
301 . . . MOBILE PHONE UNIT
302 . . . BUTTON GROUP
303 . . . PERSONAL COMPUTER APPARATUS
304 . . . NUMERICAL KEY GROUP

The invention claimed is:

1. A communication method in which at least first and second communication devices are provided and wireless communication is performed between the respective communication devices in accordance with a predetermined communication method, wherein
when a predetermined connection operation is performed in said first communication device, the communication device selects a transmitting distance, generates an inquiry message to discover other devices, and wirelessly transmits the inquiry message over the selected distance;
when a predetermined standby operation is performed in said second communication device, said inquiry message is received and a response message to the received inquiry message is wirelessly transmitted; and
said first communication device performs connection processing with respect to said second communication device, when the response message is received.

2. The communication method according to claim 1, wherein the processing to restrict said transmissible distance to the close range is processing to set transmission power to a limited value compared to the transmission power at the time of normal wireless communication.

3. The communication method according to claim 1, wherein wireless transmission of the inquiry message by a predetermined connection operation and/or reception of the inquiry message by a predetermined standby operation is performed while operation means provided in the respective communication devices are continuously operated.

4. The communication method according to claim 1, wherein after said connection processing is performed, data transfer processing is performed in accordance with a program which is being executed in the first or the second communication device.

5. The communication method according to claim 1, wherein said second communication device lowers reception sensitivity to the inquiry message, so that only the inquiry message wirelessly transmitted from within close range can be received.

6. The communication method according to claim 1, wherein the connection operation in said first communication device and the standby operation in said second communication device are made to be a common operation, and when the common operation is performed, transmission processing of the inquiry message and reception processing of the inquiry message are alternately performed.

7. The communication method according to claim 1, wherein the connection operation in said first communication device is a limited inquiry message which is distinguishable from a type of the inquiry message and said second communication device is made to await said limited inquiry message.

8. The communication method according to claim 1, wherein the connection operation in said first communication device is to select a general inquiry message or an arbitrary limited inquiry message, which should be transmitted, and said second communication device is to select the general inquiry message or the arbitrary limited inquiry message, which should be awaited.

9. A communication system in which at least first and second communication devices are provided and wireless communication is performed between respective communication devices by a predetermined communication method, wherein said first communication device comprises:
communication processing means to perform transmission and reception of a wireless signal;
connection operation means, and
control means to select a transmitting distance, generate an inquiry message to discover other devices, wirelessly transmit the inquiry message over the selected distance using said communication processing means, and to perform connection processing with respect to a transmission source of the response message when the response message to the inquiry message is received; and said second communication device comprises:

communication processing means to perform transmission and reception of a wireless signal, standby operation means, and control means to make said inquiry message received by said communication processing means when said standby operation means is operated and to make the response message to the received inquiry message wirelessly transmitted by said communication processing means.

10. The communication system according to claim 9, wherein the processing to restrict the transmissible distance to the close range in said first communication device is processing to set transmission power in said communication processing means to a limited value compared to the transmission power at the time of normal wireless communication.

11. The communication system according to claim 9, wherein while the connection operation means of said first communication device is continuously operated, the control means of said first communication device makes the inquiry message transmitted; and while the standby operation means of said second communication device is continuously operated, the control means of said second communication device makes the inquiry message received.

12. The communication system according to claim 9, wherein when the connection processing is completed by the control means of said first communication device, data transfer processing is performed in accordance with a program which is being executed in the first or second communication device.

13. The communication system according to claim 9, wherein the communication processing means of said second communication device lowers the reception sensitivity to the inquiry message so that only the inquiry message wirelessly transmitted from within close range can be received.

14. The communication system according to claim 9, wherein the connection operation means of said first communication device and the standby operation means of said second communication device are made to be a common operation means, and when the common operation means is operated, the control means of the respective communication devices perform control to make both the transmission processing of the inquiry message and the reception processing of the inquiry message performed alternately by the communication processing means.

15. The communication system according to claim 9, wherein the inquiry message in said first communication device is a limited inquiry message which is distinguishable from a general inquiry message and said second communication device is made to await said limited inquiry message.

16. The communication system according to claim 9, wherein the connection operation in said first communication device is to select a general inquiry message or an arbitrary limited inquiry message, which should be transmitted and said second communication device is to select the general inquiry message or the arbitrary limited inquiry message, which should be awaited.

17. A communication device which performs wireless communication with another communication device in accordance with a predetermined communication method, comprising:

communication processing means to perform transmission and reception of a wireless signal;

connection operation means;

standby operation means; and control means to select a transmitting distance, generate an inquiry message to discover other devices, wirelessly transmit the inquiry message over the selected distance using said communication processing means, and to perform connection processing with respect to a transmission source of the response message when the response message to the inquiry message is received;

wherein when said standby operation means is operated, said control means makes the inquiry message received and makes the response message to the inquiry message transmitted by said communication processing means;

said connection operation means and standby operation means are made to be a common operation means; and when the common operation means is operated said control means performs control to make both the transmission processing of the inquiry message and the reception processing of the inquiry message alternately performed by the communication processing means.

18. The communication device according to claim 17, wherein the processing to restrict the transmissible distance to the close range is processing to set transmission power in the communication processing means to a limited value compared to the transmission power at the time of normal wireless communication.

19. The communication device according to claim 17, wherein while said connection operation means is continuously operated, said control means performs processing to make the inquiry message transmitted.

20. The communication device according to claim 17, wherein when the connection processing is completed by said control means, data transfer processing is performed in accordance with a program which is being executed.

21. The communication device according to claim 17, further comprising:

standby operation means, wherein when said standby operation means is operated, said control means makes the inquiry message received by said communication processing means and makes the response message to the received inquiry message wirelessly transmitted by said communication processing means.

22. The communication device according to claim 17, wherein said connection operation means includes means to select a type of the inquiry message, so that the selected inquiry message of an arbitrary type can be transmitted.

23. The communication device according to claim 17, wherein while said standby operation means is continuously operated, said control means performs processing to make the inquiry message received.

24. The communication device according to claim 17, wherein said communication processing means lowers the reception sensitivity to the inquiry message so that only the inquiry message wirelessly transmitted from within close range can be received.

25. The communication device according to claim 17, wherein said standby operation means includes means to select the inquiry message which should be awaited so that the inquiry message of a selected arbitrary type can be received.

* * * * *